United States Patent Office 3,254,703
Patented June 7, 1966

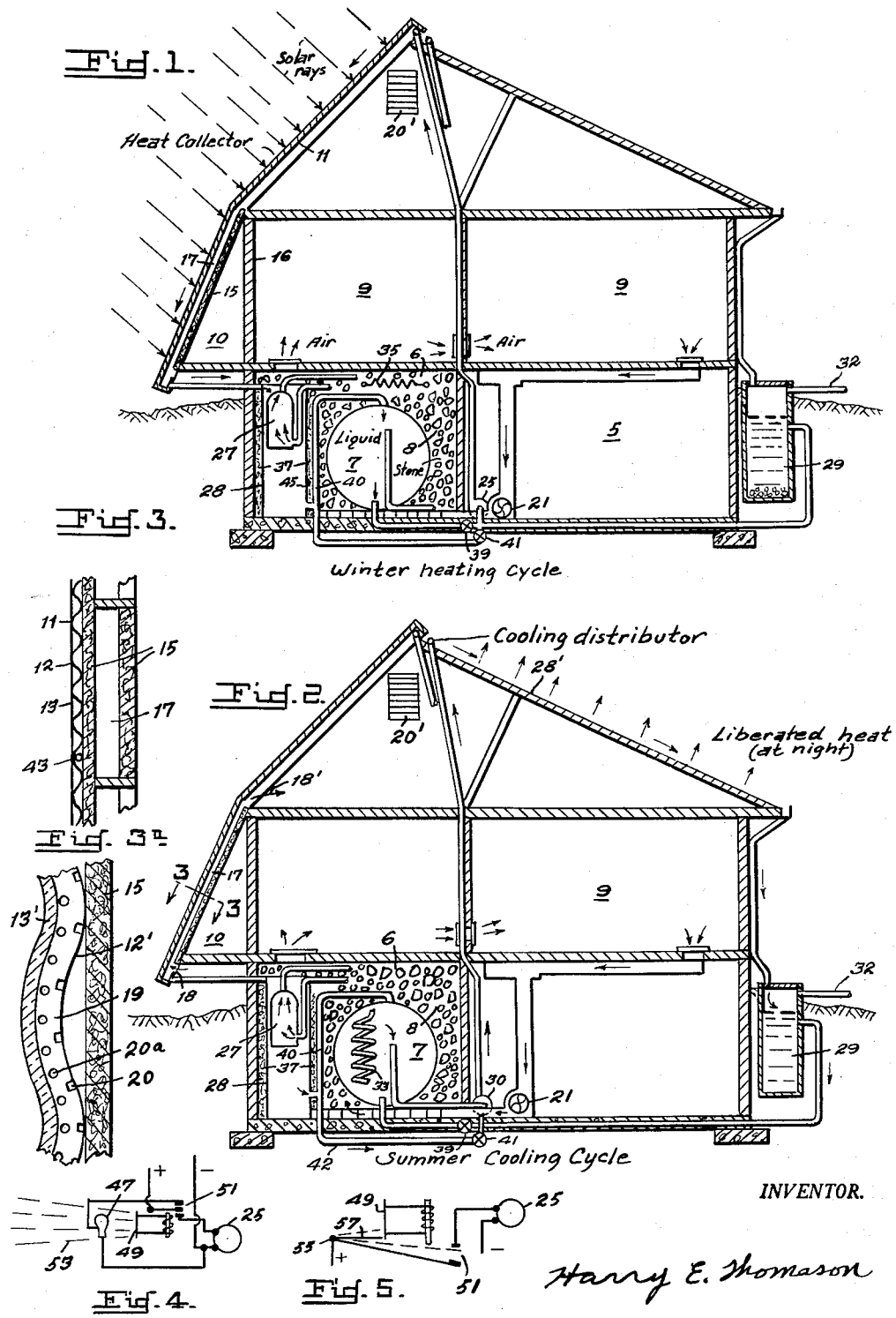

3,254,703
SOLAR HEATED HOME
Harry E. Thomason, District Heights, Md.
(7354 Walker Mill Road SE., Washington, D.C.)
Filed Mar. 31, 1961, Ser. No. 108,227
7 Claims. (Cl. 165—48)

The present invention relates to solar home heating apparatus. Many problems must be solved in devising a successful solar home. From the standpoint of architecture the problems are great due to a large heat collector set at an angle to the vertical, and it is difficult to avoid "cut-up" living quarters, unnecessary heat losses from the home during the winter and unnecessary overheating during the summer. It is very desirable to minimize the power required to cool the home during the summer and it is desirable to minimize the cost of construction of the solar heat collector, while improving performance of the collector. It is desirable to provide for effective simple heat storage, preferably within the confines of the home so that unavoidable heat losses from the heat storage apparatus will help to warm the home, and so that costs of construction can be minimized. It is desirable to keep control systems as simple and low-cost as possible. The present invention helps to overcome problems in solar heated homes.

In the drawing:

FIG. 1 is a cross section of a solar heated home illustrating wintertime heating.

FIG. 2 is a similar cross section of the same embodiment, illustrating summertime cooling.

FIG. 3 is a view along line 3—3 of FIG. 2 illustrating details of the heat collector and home construction.

FIG. 3a is a modification of the construction illustrated in FIG. 3.

FIG. 4 is a schematic diagram of a control apparatus for the heat collector pump.

FIG. 5 is a modification of the control apparatus.

FIGS. 1 and 2 represent the same embodiment but certain elements of FIG. 1 are omitted in FIG. 2, and vice-versa, to simplify the drawing. FIG. 1 includes apparatus necessary for wintertime heating while FIG. 2 includes different elements used for summertime cooling.

In FIG. 1 reference number 5 designates a basement of a solar heated home. It is evident that this space could be the "ground floor" of a home if no basement is provided and if both floors are constructed above earth level. A heat (or cold) storage bin is provided at 6 having a liquid reservoir 7 and solid material 8 such as stone, cans of Glauber's salt, or such. Said storage bin 6 is preferably insulated and substantially air tight such that the warmed (or cooled) air may be taken from the bin at various registers with a minimum of expensive ductwork. Living quarters are provided at 9 and a restricted heat and cold buffer area, usable for a closet or storage space, is designated 10. Area 10 is important for several reasons. During the wintertime it serves as a buffer zone between inside room temperatures of say 72° F., and outside temperatures of say 0° F. For summertime it serves as a buffer area between scorching outside temperatures and the living quarters which are kept cooler. Due to this construction the framework of the home is strengthened and the interior living quarters 9 are kept of conventional shape with vertical walls and rectangular floor plans. Tremendous closet and storage space are provided in this relatively restricted space.

A solar heat collector is provided at 11 with a heat collecting member at 12 (see FIG. 3), a transparent cover at 13 and preferably two layers of insulation at 15. Insulation may be provided at other places such as at 16 if desired. An air space is provided at 17 somewhat in the form of a chimney whereby air may enter adjacent the lower portion of the collector at 18 and may rise as it is warmed to come out at a higher point such as 18' (note FIG. 2). This feature becomes very important during hot summer days when some of the heat from the heat collector gets through the outermost layer of insulation. When such heat encounters the inner layer most of it is stopped and the air in the chimney or chimneys 17 is heated. Convection currents passing up through spaces 17 automatically exhaust the excess heat to the attic where it escapes through louvers 20' and helps to minimize damage to the collector which would result if internal heat were allowed to build up excessively. Closet space 10 is kept cooler and hence less heat finds its way into the home. Obviously chimneys 17 could extend to the top of the heat collector or to the top of the home if desired so that the heated air could escape at the top of the collector rather than into the attic.

Blower 21 circulates air from the living quarters through the heat bin to warm the air for wintertime or to cool it during the summer. Blower 21 pressurizes bin 6. However, the blower may be placed near the outlet or outlets of the bin so as to draw air into the bin under a slight vacuum and discharge it into the home.

Pump 25 in FIG. 1 is used to circulate water through the heat collector and the hot water from the heat collector returns through a heat exchanger unit having an inner fresh water tank 27 to heat the household domestic water supply. The inner tank is "bathed" in hot water in drum 28 from heat collector 11.

Nighttime chilling of water during the summer is illustrated at 28 in FIG. 2. Heat is liberated from water being circulated to the roof by pump 30. Such water is preferably drawn from the warmer water in the upper portion of the liquid reservoir 7 in the heat storage bin 6. This water returns from the roof cooler by way of sediment trap and automatic rainwater makeup device 29. The water returning from 29 to reservoir 7, at night, passes through valve 41, line 42, and line 40 back into reservoir 7. The water level in reservoirs 7, 28 and 29 is substantially equal. Water in 28 is heated only during the day, and is drawn from reservoir 28, as illustrated in FIG. 2 by the arrow near the bottom of reservoir 28 and the arrow to the right of reference number 42. Pump 25 draws this water through valve 41 and circulates it back to the heat collector. The water in reservoir 28 is in a static condition during the night while the rooftop cooler is operating. The water to be chilled is withdrawn from near the top of reservoir 7, by pump 30, as is indicated by the arrow to the right of cooling element 33. This leaves space in reservoir 7 for the chilled water to return to 7. Also, water flowing from line 42 to line 40 is flowing straight through the pipe T-connection near the bottom of reservoir 28. Therefore, there is no appreciable amount of mixing of the returning chilled water with the hot water in reservoir 28. As an alternative, valve 39 could be opened nightly during the summertime cooling period if desired to permit the chilled water to return to reservoir 7 via valve 39. Valves 39, 41 may be operated by reach-rods, solenoid valve actuators, or by any other means well-known to engineers. Rain falling on the roof area 28' automatically replenishes the water supply in trap 29 and in the liquid reservoirs 7 and 28 in the heat storage bin. Reservoirs 7 and 28 are preferably vented to avoid air locks or vacuum locks. When the water level has been brought up to normal the excess rainwater flows off automatically by way of overflow 32 which is set at the proper elevation to fill reservoirs 7 and 28 to a desired level, or completely full, before excess water overflows via 32. This simple apparatus provides free automatic rainwater makeup without valves or mechanical apparatus to cause trouble, and provides a trap for sediment to avoid possible clogging of the liquid lines. Inasmuch as valve 39 is open during the winter and valve 41 is open during the summer, makeup water can flow to the reservoirs 7 and 28. If desired, a valve could be provided in the return line from 29 so that makeup water can be admitted only at selected times.

In some sections of the world nighttime chilling of water at 28′ is not as great as may be desired. In such event a cooling element may be inserted in the liquid reservoir as at 33. Cooling may be supplied by means of a refrigeration unit, operable at night when the unit is more efficient, and the "coolness" so supplied is stored away to cool the home during the hot day. With this arrangement overall cooling efficiency is greatly increased and a smaller refrigeration unit and less power will produce more "cooling" of the home. If desired the roof cooler may not be used and yet the refrigeration unit will operate more efficiently to chill the water and stone at night when the refrigeration unit is discharging its heat to cool night air rather than hot daytime air. Also, liquid contact with cooling element 33 provides for better heat exchange from the cold element to the liquid, thereby improving efficiency and minimizing the amount of cooling surface required for element 33.

At times the stored solar heat may not be sufficient to maintain the desired temperature of the building. To meet this possible condition auxiliary heating means is provided such as at 35 (see FIG. 1). Such auxiliary heating means may be an electric heating element or other conventional heat producing means such as a gas or oil heater. This heat source is preferably placed such that cold air from the living quarters passes first through the heat storage apparatus to be pre-heated, then to the auxiliary heater for a temperature boost, and thence to the living quarters to warm the building.

Preheater drum 28 is preferably insulated from the remainder of the heat bin as at 37. The suction line from drum 7 has a valve at 39 and the line from drum 28 has a valve at 41, note FIG. 1. For wintertime operation valve 41 is closed and valve 39 is open. Thus pump 25 draws water from drum 7 and delivers it to the heat collector 11. Hot water from the heat collector returns to drum 28 and flows from drum 28 to drum 7 via line 40, thus heating the water in both. However, for summertime operation water in drum 7 is preferably cooled at night to provide home air conditioning yet water in drum 28 is still to be heated on sunny days to supply hot domestic water to the home. To achieve this, valve 39 is closed and valve 41 is opened. Thus chilled water is not drawn from drum 7 but water to be heated comes directly from drum 28 via line 42. This water is circulated to the collector 11 by pump 25 where it is heated and returns to drum 28. Insulation 37 minimizes heat losses from hot drum 28 to the chilled stones 6 and drum 7. Thus, a relatively small quantity of heat is stored in compartment 37, 28 sufficient to heat the domestic water for a few days, the remainder of the heat bin being used to store chilled water and stone for summertime air conditioning.

In constructing a heat collector as illustrated in FIG. 3 it becomes desirable to bake the heat collecting member 12 at high temperatures to increase the life of the member or of special coatings applied thereto. To bake such member or coatings in a factory with special ovens would be expensive. It has been found that high temperature baking can be achieved at very low cost by use of solar energy baking. For example, a heat conducting member may be coated with a dull black material which must be baked quickly in order to extend the life of the coating manyfold. Using the method herein described, the surface is blackened during a sunny day, or even a cloudy day when solar input is high, and is promptly covered with a transparent or semi-transparent material such as a sheet of plastic. Solar energy is trapped beneath the plastic and the temperature rises so as to bake the coating and thus prolong its life. This sheet of plastic may be removed after the baking is completed, or may be left in place to serve as a permanent transparency as at 13. Thus, solar energy is used to advantage in constructing the solar heat collector.

The method of heat treating material by solar energy is valuable for curing coatings or paints by baking, thus prolonging the life of the coating or paint manyfold. It has been said that certain coatings, if heat cured promptly after being applied, will last more than five times as long as the same coatings without heat curing. Thus, by the simple solar energy baking method disclosed herein, the life of a coating of paint, for example, may be greatly increased. However, the method may also be used for other purposes such as heat treating thermo-setting plastics, etc. In FIG. 3a a heat collector surface layer is illustrated which may be heat cured by solar energy if desired. Such layer preferably comprises a heat collecting porous layer of material 19 having perforations or passages 20, 20a. Layer 19 is preferably attached to an inner base layer of material 12′ which is substantially impervious to a fluid being circulated through the collector and preferably having an external layer of material 13′ which is transparent or reasonably transparent to admit solar energy to or through the material 19. Material 19 may be darkened to absorb solar energy and to thereby heat fluid passing thereinto or therethrough via perforations or passages 20 or 20a. However the material may be transparent or translucent to let solar energy penetrate to inner layer 12′ where it heats said inner layer and fluid coming in contact therewith. The porous material may be of a desired thickness of a suitable material such as a porous metallic foam-like material, or plastic, or such, or may be one or more layers of a mesh-like material. Such material may be treated with dyes or other substances within the porous material itself or may be provided with coatings to render the material dark and more heat-absorbing. Alternatively, the material may be semi-darkened so as to become heated itself or may be transparent or translucent to admit solar energy to the inner surface 12′, which inner surface may be darkened to collect solar energy to heat a fluid being circulated through the heat collector. Fluid passages 20 are preferably adjacent the heat collecting surface 12′ such as by being embedded in the material 19. Some materials are porous enough for fluid flow therethrough without additional passages. Fluid may be circulated through passages 20 only, or through passages 20a only, or through both. Passages similar to those at 20a are found at random in some foam-like preparations. Although the foam-like and transparent layers are illustrated as being applied to a corrugated base 12′ the base may take other forms or shapes as desired, including planar. The method of heat curing described may be utilized, if desired, to heat cure any one or all of the layers or surfaces described herein.

Heat collector pump 25 is preferably controlled by a switch device responsive to temperatures in the heat collector being raised above temperatures of water being pumped to the heat collector. The switching on-and-off operation is preferably achieved by use of a thermo-couple device having its hot junction 43 subjected to heat collector temperatures and its cold junction 45 subjected to temperatures of water going to the collector. Thus, if the heat collector temperature exceeds the temperature of the water going to the collector, a current flows in the thermo-couple circuit. This current is used to trip a switch to start circulating pump 25. The current flowing in the thermo-couple circuit may be amplified to trip a relay switch to cut the pump on. When the heat collector temperature drops, or the temperature of the water to the collector rises, so that these temperatures approach one-another, the flow of current in the thermo-couple circuit ceases or becomes low enough to stop the circulating pump. Although the hot junction 43 is illustrated as being placed in the heat collector it may be placed at other places to be responsive to solar heat, such as in a separate solar heated control box. Also, the cold junction 45 may be placed at a location other than that illustrated in FIG. 1, such as at the inlet to pump 25, or at the outlet of drum 7, or other. Changing the locations of these junctions will affect the operating characteristics of the control system to some extent but the basic pattern will be similar.

As an alternative to the thermocouple switching mechanism to control operation of pump 25 a light sensitive switch unit may be used. However, an ordinary photocell and relay unit often is not sensitive enough to light intensity changes. Hence, if the switch is tripped on when hazy sunlight occurs it will not be tripped off when the light intensity is lowered to a level of bright cloudiness. To overcome this deficiency the present invention provides means to slightly increase the intensity of light falling on the light sensitive element when natural light drops to a predetermined level and the pump is cut off. Attention is directed to FIG. 4 where the light sensing element 49 is exposed to light rays 53 which may be entering a north-facing window for example. As natural light intensity diminishes due to clouds or the approach of night the light sensitive element 49 trips relay switch 51 and cuts off the pump 25. At approximately this same time lamp 47 in the vicinity of the light sensitive element is turned on to thus boost the intensity of the light at the light sensitive element. However, even the increased intensity of light at the light sensiitve element is hardly sufficient to trip the pump switch back on. Thus, the lamp will stay lighted until the intensity of natural light from the window is increased slightly to a point where the lamp light, plus the natural light, will trip the pump switch back on. When the natural light intensity thus rises again, such as due to the passing of a cloud, then the pump is cut on and the lamp is turned off. However, the slightly increased level of natural illumination is sufficient to keep the pump switched on even without the artificial light which was cut off. If the clouds do not pass for the remainder of the day, or if the cutting off of the pump was due to diminishing natural light with the approach of night, the lamp will stay lighted and will provide a night light for the area. When natural light of the desired intensity returns pump 25 is cut back on and the lamp is cut off.

Although the present invention has been explained with reference to a light sensing element exposed to natural light through a window, the unit may be used outdoors instead of inside. In either event the night light is cut on automatically every evening and is cut off each time natural light reaches the desired level to produce solar heating of fluid being circulated by pump 25. Thus, the apparatus described performs at least three functions, (1) it turns pump 25 on and off, (2) it provides an automatic night light, (3) it provides a visual indicator as to when the pump switch is on or off.

The essence of this invention may be embodied in other simple forms if desired. Note FIG. 5 for example where, instead of having a lamp turn on and off as pump 25 is turned on and off, a simple louvre or screen 57 may be moved about pivot 55 to partially shade the light sensing element 49 when the natural light reaches a predetermined level, and pump 25 cuts on such as due to sunshine. When natural light intensity is diminished, such as by clouds, pump 25 is cut off and the light screen is moved to admit more natural light. The increase in natural light is hardly sufficient to cut the pump back on. However the increased natural light plus a small increment of additional light as the sun comes from behind a cloud will be sufficient to cut the pump on and move the screen 57 back to partially shade light sensing element 49.

Instead of feeding current into a nightlight lamp as illustrated in FIG. 4, current may be fed back into the circuit of the light sensing and switching apparatus to aid in reversing the switch. However, in this proposed arrangement the benefits of the automatic nightlighter and the visual indicator are lost.

Under some conditions the apparatus described herein may "cycle" and may open and close the circuit to the light intensifying apparatus rather rapidly. This condition may be remedied in various ways such as by placing a time delay element in the circuit to the light intensifying apparatus to delay the dimming or brightning of the light from the light intensifying apparatus.

If desired a simple time switch may be connected in the pump circuit to limit operation to certain hours of the day. For example, inasmuch as solar input is greater near noon the time switch may be set to limit pump operation to hours such as 9:00 a.m. to 3:30 p.m. or 8:00 to 4:30 p.m.

Having thus described my invention what I claim is:

1. In a solar heated or cooled building the combination of walls, floors and ceilings enclosing spaces in said building, said spaces including a heat or "cold" storage compartment, heat or "cold" storage apparatus in said compartment, means for cooling the storage apparatus to cool said building, auxiliary means for cooling said storage apparatus when said first means is inadequate, solar heating means for heating said storage apparatus to warm said building, auxiliary means for heating when said solar heating means is inadequate, means for circulating a fluid to be heated through said storage apparatus to heat the building, said auxiliary heating means being interposed in the direction of flow of said fluid past said storage apparatus and ahead of the space in the building to be heated.

2. In a solar heated or cooled building the combination of walls, floors and ceilings enclosing spaces in said building, said spaces including a heat or "cold" storage compartment, heat or "cold" storage apparatus in said compartment, rooftop evaporative means for cooling the storage apparatus to cool said building, auxiliary means for cooling said storage apparatus when said first means is inadequate, solar heating means for heating water flowing to said storage apparatus to warm said building, auxiliarly means for heating when said solar heating means is inadequate, and an insulated compartment adjacent to said heat or "cold" storage compartment containing a heat exchanger unit through which solar-heated water flows for heating domestic water in said heat exchanger unit.

3. A solar heated building comprising walls, ceilings and floors defining spaces, heat or "cold" storage apparatus located in an insulated space of said building, said insulated space being substantially air tight and containing a tank of liquid surrounded by solid heat or "cold" storage material, means to introduce air to be heated or cooled into said insulated space, means to expel heated or cooled air from said insulated space, and means in said insulated space for providing auxiliary heat when needed.

4. In a solar heated or cooled building the combination of walls, floors and ceilings and a solar heat collector enclosing spaces in said building, said spaces including a restricted space between a wall of said building and said solar heat collector on said building, said solar heat collector comprising insulation, said restricted space acting as a buffer zone between the exterior and interior of said building, and an additional space between said restricted space and said heat collector insulation to permit escape of excessive heat generated within said solar heat collector.

5. A solar heated building comprising walls, ceilings and floors defining spaces, a solar heat collector comprising insulation constructed substantially integrally with said building, said heat collector being spaced from a wall of said building to define a passageway between said wall and said collector insulation to permit heat coming through said heat collector to be removed from said passageway.

6. In a solar heated or cooled building the combination of walls, floors and ceilings enclosing spaces in said building, said spaces including a heat or "cold" storage compartment, heat or "cold" storage apparatus in said compartment, means operable at night by passing a liquid from said storage apparatus over a roof-like structure, in direct contact with nighttime air, for cooling the storage apparatus to cool said building, auxiliary means for cooling said storage apparatus when said first means is inadequate, solar heating means for heating said storage apparatus to warm said building and auxiliary means for heating when said solar heating means is inadequate.

7. A building adapted to be heated by solar energy and cooled comprising walls, a floor and a ceiling enclosing a first space; walls, a floor and a ceiling enclosing a second space at a level higher than said first space; means in said first space comprising a compartment for heat or "cold" storage apparatus, means in said compartment to store heat or "cold"; a wall of said second space above said first space comprising an insulated wall and a solar heat collector, means connecting said solar heat collector to said heat or "cold" storage means, said solar heat collector having insulation parallel to and spaced from said insulated wall thus defining an air space therebetween for passage of air, an inlet and an outlet for said space, the arrangement being such that heat leakage from said solar heat collector to said air space is reduced by the heat collector insulation, and said insulated wall further reduces heat leakage from said air space while air currents in said air space take away heat leaking into said space from said heat collector.

References Cited by the Examiner
UNITED STATES PATENTS

| | | | |
|---|---|---|---|
| 201,439 | 3/1878 | Moreau | 126—270 |
| 965,391 | 7/1910 | Little | 237—1 |
| 1,240,890 | 9/1917 | Shuman et al. | 126—271 |
| 2,342,211 | 2/1944 | Newton | 165—18 |
| 2,396,338 | 3/1946 | Newton | 165—18 |
| 2,553,302 | 5/1951 | Cornwall | 237—1 |
| 2,559,869 | 7/1951 | Gay | 126—270 |
| 2,559,871 | 7/1951 | Gay | 237—1 |
| 2,660,863 | 12/1953 | Gerhart | 126—271 X |
| 2,677,243 | 5/1954 | Telkes | 165—104 X |
| 2,680,565 | 6/1954 | Lof | 237—1 |
| 2,689,090 | 9/1954 | Wetherbee | 237—1 |
| 2,969,918 | 1/1961 | Phelps | 237—1 |
| 2,998,005 | 8/1961 | Johnston | 126—270 |
| 3,022,781 | 2/1962 | Andrassy | 126—271 |
| 3,039,453 | 6/1962 | Andrassy | 126—271 |
| 3,076,450 | 2/1963 | Gough et al. | 126—271 |
| 3,090,717 | 5/1963 | Raczynski et al. | 156—272 |
| 3,123,511 | 3/1964 | Coleman | 156—272 |

FOREIGN PATENTS

| | | |
|---|---|---|
| 909,092 | 11/1945 | France. |

ROBERT A. O'LEARY, *Primary Examiner.*

HERBERT L. MARTIN, CHARLES SUKALO,
*Examiners.*

R. F. BURNETT, A. W. DAVIS, *Assistant Examiners.*